Figure 1:
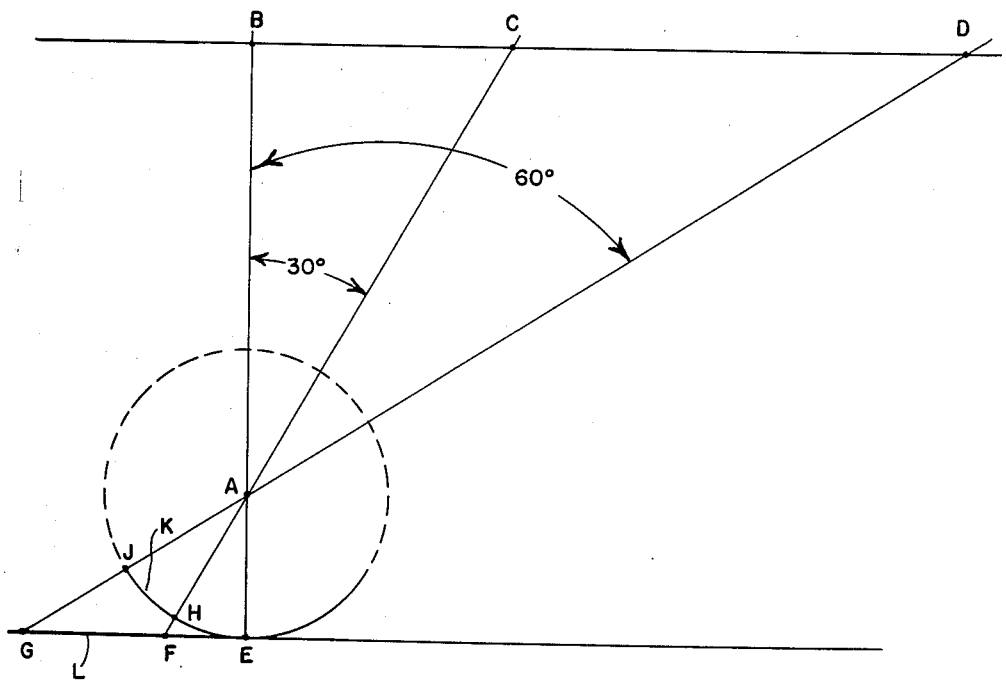

Dec. 4, 1962 H. VON BUBNA-LITTITZ 3,066,572
PHOTOGRAPHIC APPARATUS

Filed June 16, 1958 3 Sheets-Sheet 3

INVENTOR
HEKTOR VON BUBNA-LITTITZ
BY
ATTORNEYS

3,066,572
PHOTOGRAPHIC APPARATUS
Hektor von Bubna-Littitz, Toesca No. 2948,
Santiago, Chile
Filed June 16, 1958, Ser. No. 742,379
1 Claim. (Cl. 88—24)

This invention relates to the art of photography and more particularly to a device for correcting or rectifying distortions in a negative film while printing a positive picture.

Negatives made with rotary type cameras necessarily have distortions because the focal distance does not change during the rotation of the camera. This is caused by arranging the film in a semi-circle around the lens so that the distance from lens to film is always the same. All objects situated to the right and to the left of the center of the picture appear smaller than in reality and straight horizontal lines become curves which approach each other on both sides.

These distortions show more clearly the closer the objects are to the camera. Because of this fact, the known rotary cameras are not suitable for close-up and interior picture taking.

My invention contemplates using an enlarging apparatus having a lens and light-sensitive paper, between which is situated a partition with a narrow slit. Through this slit only a small sector of the negative is projected upon the paper at one time and negative and light-sensitive paper are arranged to be oppositely horizontally movable. The movements in opposite directions are synchronized in such a manner that eventually the entire image is projected upon the paper.

In order to correct the distortions, as will later be more fully explained, the distance from paper to lens is continuously varied during horizontal movements of negative and light-sensitive paper in such a manner that the objects which were portrayed too small on the negative are correspondingly enlarged. This variation of distance takes place increasingly from the picture center outward toward both sides.

With the aid of the rectification, the properties and qualities of the lens used in the camera are brought out to the full extent. This applies also to the disadvantage of the wide-angle lenses used heretofore in rotary cameras, which is called "wide-angle effect" and reproduces objects situated in different planes in such a manner that they appear to be at greater distances from each other than in reality. The use of a normal-angle lens in the camera will, however, result in a completely true-to-nature picture after the correction or rectification has been carried out in the manner herein explained.

The individual movements of negative and sensitive paper can take place independently of one another or they can be coupled with each other in any desired manner, so that not only a natural perspective can be achieved but also any desired falsification of perspective may result, for example, for advertising purposes.

Furthermore, the apparatus also provides for an automatic sharp-focusing of the negative during its movement.

The pattern of motion can be such that the paper is exposed in one single continuous motion from one side to the other, or with a lower intensity of light the motion can be repeated as many times as needed until the necessary exposure has been attained.

The negative and the light-sensitive paper can also be stretched over correspondingly shaped drums which rotate in opposite directions and whose movements are so synchronized that the same portions of the negative are reproduced on the same portions of the light-sensitive paper until finally the finished picture results. This procedure is particularly suitable for utilization in film processing where a multiple of rectifying operations per second is required.

It is accordingly a broad object of this invention to provide a device for correcting the distortions in a negative during the printing of a positive picture.

It is a more specific object of this invention to provide a device for printing an undistorted positive picture from a distorted negative film.

It is another object of this invention to compensate for distortions occurring in a negative film by continuously varying the spacing between the light-sensitive paper and the film during the printing process.

Figure 2:
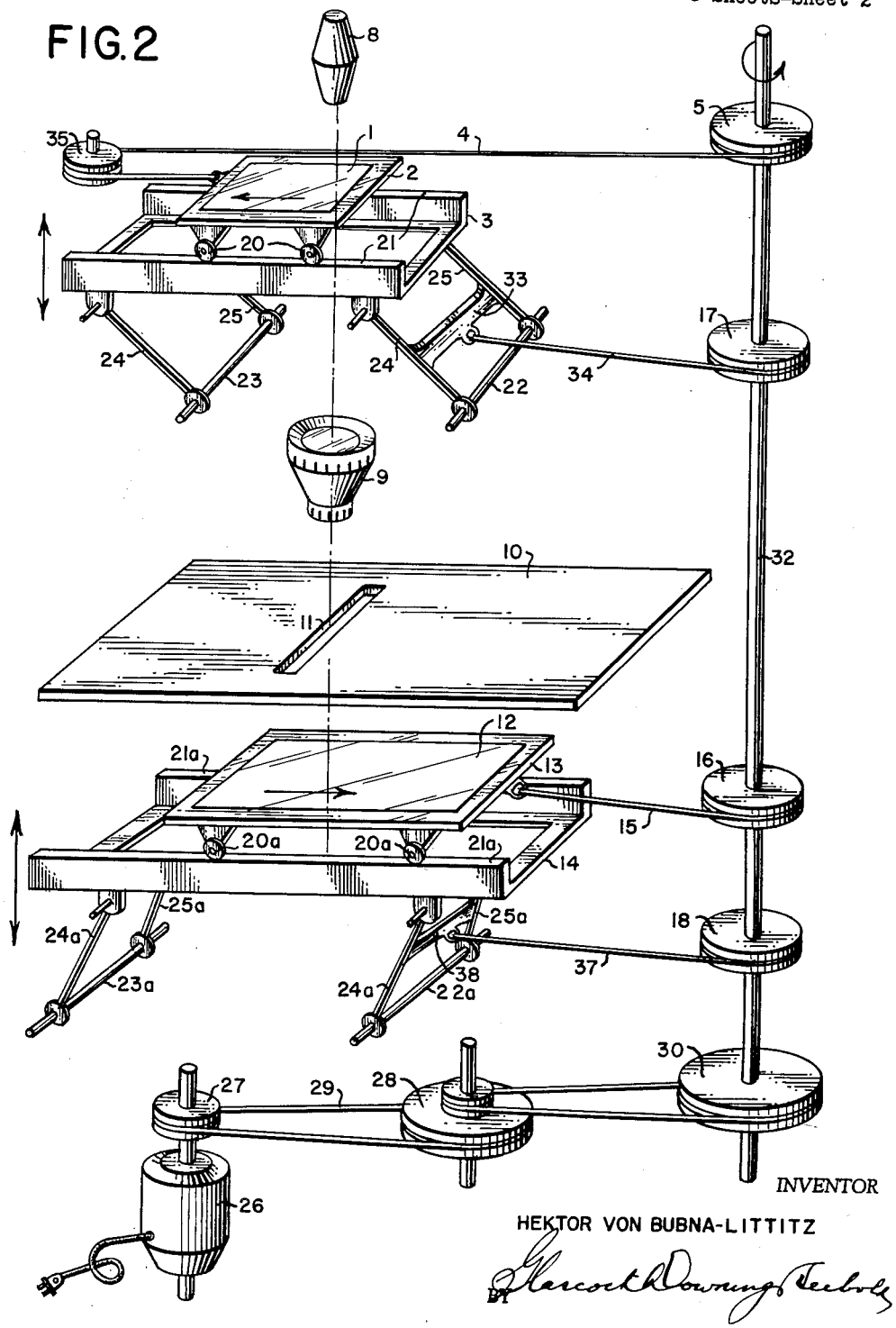
Figure 3:
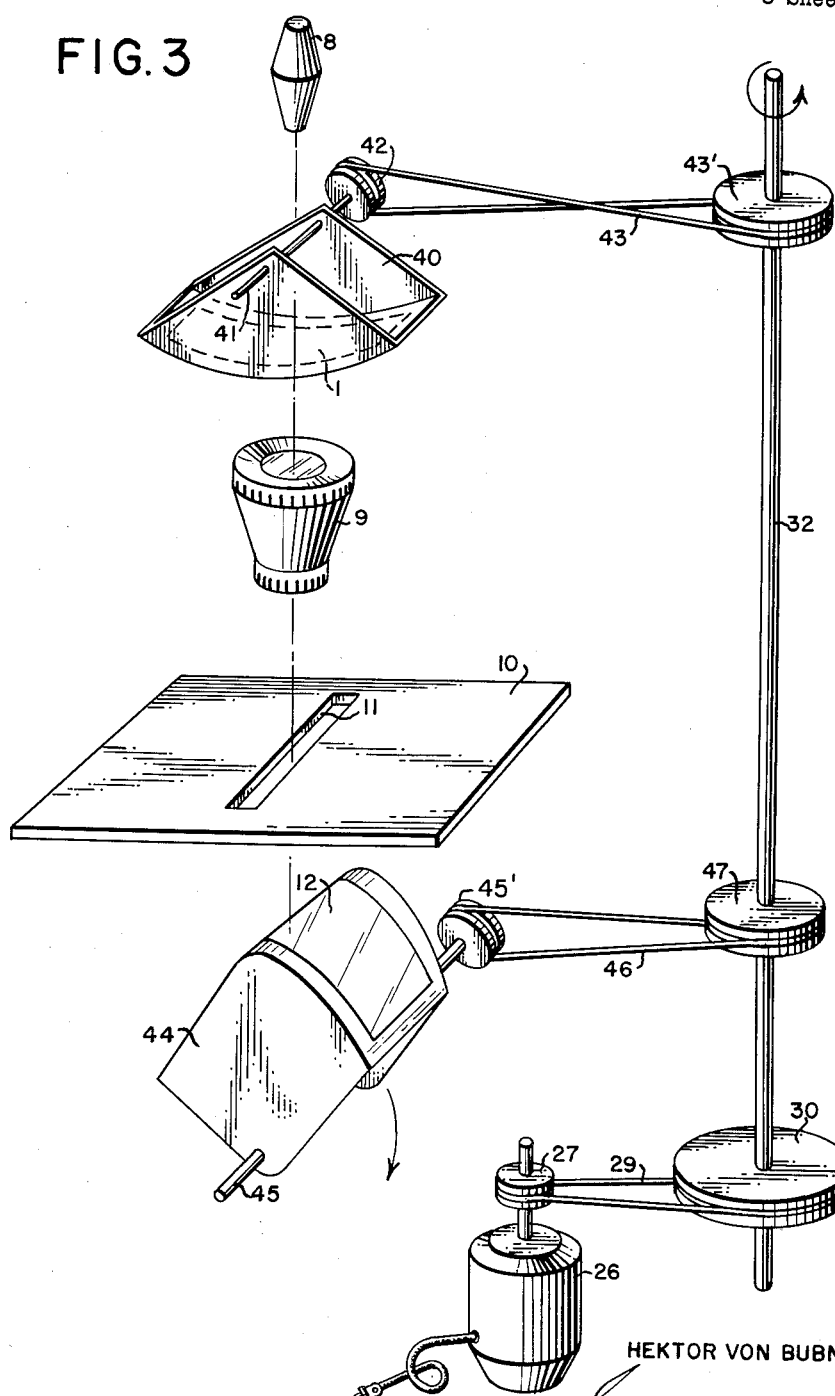

Referring now to the drawings wherein like reference characters designate like or similar parts, FIG. 1 is a diagrammatical representation to explain the distortions occurring in the negative, FIG. 2 is a perspective view of a distortion correction device in accordance with the invention, and FIG. 3 is a perspective view of another embodiment of the distortion correction device.

In summary, the invention consists of a device for rectifying distorted negatives while printing a positive picture comprising a pair of aligned members supported for arcuate and horizontal synchronized motion, one holding the negative and one holding the light-sensitive paper. A light source is arranged to pass light through the negative and toward the sensitive paper and a lens and apertured screen are fixed between the members to pass only a limited concentration or sector of light onto the paper. The continuous varying of the distance between the opposed portions of the negative and paper caused by the arcuate motion, as seen through the aperture, automatically corrects the distortions caused by the focal distance not changing during rotation of the camera while exposing the film.

Reference is now made to the diagram of FIG. 1 for a review of the mechanics behind the production of a distorted negative when a rotary camera is used.

In case of exposure of film with a normal camera, there exists a certain ratio between the object photographed and its representation on the film. In the figure, A is the intersection point of the light rays in the camera. Thus, a tree ten feet high situated directly in front at point B will, for example, have a length of 10 mm. on a film mounted in a single plane. Another tree, also 10 feet high, situated in the same plane as the first one but 30 degrees to its right at point C, is projected on the film at point F. It also will measure 10 mm. on the film, since the ratio A–B:A–E is the same as A–C:A–F. The same holds for a 10 foot tree 60 degrees to the right because the ratio A–D:A–G is the same as A–B:A–E.

With the use of a normal planar camera the distance of the two trees from the center of the film corresponds with reality, because B–C:C–D equals E–F:F–G. In other words, the planar positioning of the film behind the lens results in an undistorted representation.

However, the case is different if, in a camera with a rotatable lens, the film is positioned semi-circularly like the film K in the figure.

The distance A–E is still the same. Therefore, the central tree (B) will again measure 10 mm. on the film, but tree C will be reproduced smaller in height although A–C is just as far as before, because the distance A–H is shorter than the former A–F. Likewise, A–J is shorter than A–G, and therefore tree D will be reproduced still smaller in height than tree C, although all three trees are actually of the same height and are positioned in a single plane. Likewise the distance of the two trees from the center E of the film will be distorted because the curved segment E–H is shorter than the distance E–F, and the curved segment H–J is shorter than the distance F–G.

Referring now to FIGURE 2 of the drawings, wherein is illustrated a structural organization to correct the above distortions during printing, the negative 1 and light-sensitive paper 12 are positioned on sheets 2 and 13, sheet 2 being transparent, which are carried on wheels 20 and 20a supported on tracks 21 and 21a of members 3 and 14. A pair of shafts 22 and 23 are mounted in a frame and have arms 24 and 25 journaled thereon and extend upward to be pivotally joined to the bottom of member 3. Shafts 22a and 23a are similarly mounted in a frame and have arms 24a and 25a journaled thereon to support member 14. A source of light 8 illuminates the negative and passes through the transparent sheet to lens 9 whereby it is projected upon the light-sensitive material 12 (paper or film).

An opaque screen 10 is disposed between the lens and the sensitive material. A relatively narrow elongated aperture 11 is formed in the screen to transmit only a narrow strip of light. In practice the aperture is formed to be about as long as the width of the sensitive paper and can be made about 1.5 mm. in width without loss of sharpness. The screen is located with respect to the focal length of lens 9 so that only a limited concentration of light representing only a small sector of the negative passes through the aperture.

A motor 26 having a pulley 27 connected to pulley 28 by belt 29 is further connected to main drive pulley 30 by belt, 31. A shaft 32 is keyed into drive pulley 30 and carries pulleys 18, 16, 17 and 5. Pulley 18 has belt 37 connected to a plate 38 bridging between arms 24a and 25a. Pulley 16 is connected to movable sheet 13 by belt 15; pulley 17 is connected to a plate 33 bridging between arms 24 and 25 by belt 34; and pulley 5 is connected to movable sheet 2 by belt 4 passing over pulley 35 to reverse the motion of sheet 2 with respect to sheet 13. Operation of motor 26 will turn shaft 32 in the direction of the arrow, tensioning belts 37 and 34 and causing opposite arcuate motion of members 3 and 14 and, simultaneously, sheets 2 and 13 will move horizontally in opposite directions under the urgings of belts 15 and 4. The result is that the distance between opposing portions of the negative and sensitive paper is continuously changing, the distance being shortest at the midpoint of travel and greatest at the ends thereof. Obviously, the direction of motion of members 3 and 14 must reverse if the scanning movement is to be repeated, as under conditions of low light intensity. This may be done by many structures known in the art, such as cam plates, resilient springs to return the motion acting against slipping clutches, and the like.

In FIGURE 3 an embodiment is shown which contemplates exposure of the film or paper by means of frequent repetition of the movements. This embodiment can be of special significance in connection with film processing where the duration of projection of the image lasts only a 16th or 24th part of a second. The entire rectification process must then take place during this time.

The negative 1 to be rectified is stretched upon a drum 40 which is a segment of a cylinder. The drum is carried by a shaft 41 which constitutes the turning axis of the drum. A pulley 42 is carried by the shaft 41 and a transmission belt or the like 43 is trained about the pulley 42 and a pulley 43' on the shaft 32. The peripheral surface of the drum 40 is of a shape which gives the negative in the course of rotation a continuously varied distance from the lens 9, i.e., which always places that portion of the negative which is currently in the line of projection at the respective focal distance which corresponds with the enlarging scale at the respective point of the light-sensitive material. The light source 8 provides for the respective illumination of the negative.

The light-sensitive material (paper or film) 12 is positioned on a drum 44 which is a segment of a cylinder. The drum 44 is carried by a shaft 45, which shaft defines the turning axis of the drum 44. A pulley 45' is mounted on the shaft 45, and a transmission belt or the like 46 is trained around pulley 45' and a control pulley 47 mounted on shaft 32. A screen 13 between the lens 9 and the drum 44 intercepts the greater portion of the projection and permits only a narrow strip of the image to be transmitted through the aperture 11. The drum 44 is of a shape which in the course of rotation always places the light-sensitive material at a distance from the lens corresponding to the enlarging scale which, in the process of rectification, is required at the particular point.

The pulleys 43 and 47 can be operated independently of each other or can be coupled with each other by any well known mechanical means. The movements of rotation which take place in opposite directions are synchronized in such a manner that the same points of the negative are always reproduced at the same points of the light-sensitive material so that the final image is produced by means of frequent repetition of rotation.

Referring again to FIG. 1 for a practical example of the geometry of a specific problem, if the film K was positioned semi-circularly in the camera and stretched out in a plane in the distortion correcting apparatus, then the distance of the paper from the lens must be increased during the horizontal movements of film and paper to the 30 degree point to such an extent that the scale has been changed in the ratio A–H to A–F, because then the tree will again measure 10 mm. After 60 degrees the ratio A–J to A–G applies for obtaining the same objective size.

Likewise, the horizontal speed of the paper must be increased, namely, at 30 degrees in the ratio E–H to E–F and at 60 degrees in the ratio E–J to E–G.

If one proceeds according to this principle, the enlargement of a normal negative in the normal manner and the enlargement of a distorted negative in the distortion correcting apparatus is most effective if the same enlarging scale has been used.

Since many changes could be made in the above description and many widely different embodiments of this invention could be made without departing from the scope thereof, it is intended that all matter contained in the above description or shown in the accompanying drawings shall be interpreted as illustrative and not in a limiting sense.

I claim:

A device for printing an undistorted positive picture on light-sensitive paper from a distorted negative film, comprising in combination, a pair of semi-circularly curved positioning members for holding the film and the paper in aligned relationship, a shaft for each member constituting the turning axis of each member, at least one of said shafts being offset with respect to the geometric center of its semi-circularly curved positioning member, a light source fixed to pass light through the film toward the paper, a lens to focus the light from the film onto the paper, a screen between the lens and the paper and having a relatively narrow aperture formed therein to allow only a small portion of the light from the lens to reach the paper, and motive means to rotate the shafts and said members about their respective axes in mutually opposite directions to thereby continuously vary the spacing between the facing portions of the film and paper as seen through the aperture, the said shafts being parallel to the longitudinal axis of said aperture.

References Cited in the file of this patent

UNITED STATES PATENTS

| | | |
|---|---|---|
| 1,652,271 | Cooke | Dec. 13, 1927 |
| 1,711,909 | Stalcup | May 7, 1929 |
| 1,906,973 | Kingsbury | May 2, 1933 |
| 2,549,699 | McLaughlin et al. | Apr. 17, 1951 |
| 2,650,517 | Falk | Sept. 1, 1953 |
| 2,785,599 | Sonnberger et al. | Mar. 19, 1957 |

FOREIGN PATENTS

| | | |
|---|---|---|
| 975,090 | France | Oct. 11, 1942 |
| 1,158,065 | France | Jan. 13, 1958 |
| 216,416 | Australia | July 28, 1958 |